(12) United States Patent  
Li

(10) Patent No.: US 12,349,201 B2  
(45) Date of Patent: Jul. 1, 2025

(54) METHOD FOR RANDOM ACCESS, TERMINAL, AND STORAGE MEDIUM

(71) Applicant: BEIJING XIAOMI MOBILE SOFTWARE CO., LTD., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 524 days.

(21) Appl. No.: 17/775,824

(22) PCT Filed: Nov. 11, 2019

(86) PCT No.: PCT/CN2019/117249  
§ 371 (c)(1),  
(2) Date: May 10, 2022

(87) PCT Pub. No.: WO2021/092734  
PCT Pub. Date: May 20, 2021

(65) Prior Publication Data  
US 2022/0386383 A1 Dec. 1, 2022

(51) Int. Cl.  
H04W 74/0833 (2024.01)  
H04B 7/06 (2006.01)  
H04W 36/00 (2009.01)  
H04W 36/06 (2009.01)

(52) U.S. Cl.  
CPC ...... *H04W 74/0833* (2013.01); *H04B 7/0686* (2013.01); *H04W 36/0079* (2018.08); *H04W 36/06* (2013.01)

(58) Field of Classification Search  
CPC ......... H04W 74/0833; H04W 36/0079; H04W 36/06; H04B 7/0686; H04B 7/0695  
See application file for complete search history.

(56) References Cited

U.S. PATENT DOCUMENTS

| 9,918,344 | B2 | 3/2018 | Martinez Tarradell et al. |
| 10,651,899 | B2 * | 5/2020 | Islam ............... H01Q 1/245 |
| 11,122,526 | B2 * | 9/2021 | Zhang ............... H04W 72/51 |
| 2016/0302234 | A1 | 10/2016 | Martinez Tarradell et al. |
| 2017/0346535 | A1 * | 11/2017 | Islam ............... H04W 16/28 |
| 2018/0139784 | A1 * | 5/2018 | Ryoo ............... H04L 5/0051 |
| 2018/0152968 | A1 * | 5/2018 | Martinez Tarradell ... H04L 1/00 |
| 2020/0187258 | A1 * | 6/2020 | Lee ............... H04W 36/304 |
| 2023/0020868 | A1 * | 1/2023 | Su ............... H04W 74/0833 |

(Continued)

FOREIGN PATENT DOCUMENTS

| CN | 108738141 A | 11/2018 |
| CN | 109155655 A | 1/2019 |
| IN | 110049574 A | 7/2019 |

(Continued)

OTHER PUBLICATIONS

Extended European Search Report of EP Application No. 19952419.0 dated Jun. 19, 2023 (6p).

(Continued)

*Primary Examiner* — Habte Mered  
(74) *Attorney, Agent, or Firm* — Arch & Lake LLP; Shen Wang; Hao Tan

(57) ABSTRACT

A method for random access, including: executing at least one of switching beams or switching coverage enhancement levels, for a random access attempt based on a preset switching strategy.

20 Claims, 7 Drawing Sheets

(56) References Cited

U.S. PATENT DOCUMENTS

2023/0261720 A1\* 8/2023 Fan ..................... H04B 7/0695
　　　　　　　　　　　　　　　　　　　　　　375/267

FOREIGN PATENT DOCUMENTS

| WO | 2017204934 A1 | 11/2017 |
| WO | 2018185640 A1 | 10/2018 |
| WO | 2019095307 A1 | 5/2019 |

OTHER PUBLICATIONS

International Search Report of PCT/CN2019/117249 dated Jul. 22, 2020 with English translation, (4p).

\* cited by examiner

METHOD FOR RANDOM ACCESS, TERMINAL, AND STORAGE MEDIUM

CROSS-REFERENCE TO RELATED APPLICATION

This application is a U.S. national phase of International Application No. PCT/CN2019/117249, filed on Nov. 11, 2019, the entire content of which is incorporated herein by reference for all purposes.

TECHNICAL FIELD

The disclosure relates to the field of wireless communication, and in particular to a method for random access, a terminal and a storage medium.

BACKGROUND

A random access attempt refers to that a terminal transmits a random access request on a random access channel and a base station transmits a random access response based on the random access request, to complete random access of the terminal. The terminal enters a connected state after completing random access. In the connected state, the terminal can exchange data with the base station.

In some cases, one random access attempt may not succeed and multiple random access attempts are required.

SUMMARY

A method for random access is provided. The method includes: executing at least one of switching beams and switching coverage enhancement levels, for a random access attempt based on a preset switching strategy.

A terminal is provided. The terminal includes: an antenna; a memory; and a processor, respectively connected to the antenna and the memory, configured to, by executing computer-executable instructions stored on the memory, control wireless signal transmission and reception of the antenna and perform the method for random access as described above.

A computer storage medium is provided. The computer storage medium has stored therein computer-executable instructions that, when executed by a processor, the method for random access as described above is performed.

DETAILED DESCRIPTION

Figure 1:
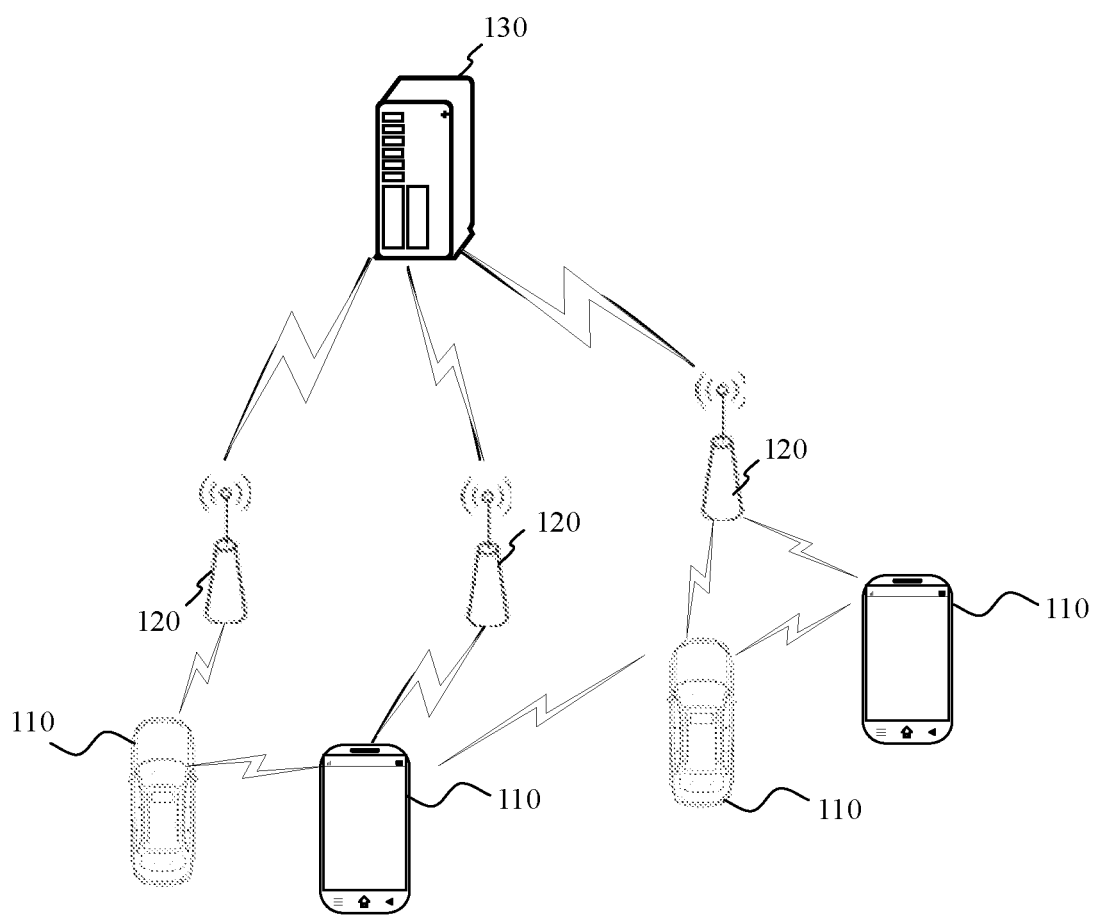
FIG. 1 is a schematic structural diagram illustrating a wireless communication system, according to some examples of the disclosure.

Network architectures and service scenarios described in examples of the disclosure are intended to more clearly illustrate technical solutions provided in examples of the disclosure but do not constitute a limitation to technical solutions provided in examples of the disclosure. Those of ordinary skill in the art will know that the technical solutions provided in examples of the disclosure are equally applicable to similar technical problems as the network architectures evolved and the new service scenarios emerged.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

FIG. 1 is a schematic structural diagram illustrating a wireless communication system, according to some examples of the disclosure. As illustrated in FIG. 1, the wireless communication system is a communication system based on cellular mobile communication technologies. The wireless communication system includes terminals 110 and base stations 120.

The terminal 110 is a device that provides voice and/or data connectivity to a user. The terminal 110 can communicate with one or more core networks via a radio access network (RAN). The terminal 110 can be an Internet of Things (IoT) terminal such as a sensor device, a mobile phone (or a cellular phone) and a computer with the IoT terminal such as a fixed, portable, pocket-sized, handheld, built-in computer or vehicle-mounted device, for example, station (STA), subscriber unit, subscriber station, mobile station, mobile, remote station, access point, remote terminal, access terminal, user terminal, user agent, user device, or user equipment (UE). Alternatively, the terminal 110 may also be an unmanned aircraft. Alternatively, the terminal 110 may also be an in-vehicle device, for example, a trip computer having a wireless communication function or a wireless terminal connected externally to the trip computer. Alternatively, the terminal 110 may also be a roadside device, for example, a street lamp, a signal lamp or other roadside device having the wireless communication function.

The base station 120 may be a network side device in the wireless communication system. The wireless communication system may be the $4^{th}$ generation mobile communication (4G) system, also known as the long term evolution (LTE) system. The wireless communication system may also be the $5^{th}$ generation mobile communication (5G) system, also known as the new radio (NR) system or 5G NR system. Alternatively, the wireless communication system may also be a next-generation system of the 5G system. The access network in the 5G system can be called the new generation-radio access network (NG-RAN).

The base station 120 may be an evolved base station (eNB) adopted in the 4G system. Alternatively, the base station 120 may also be a base station (gNB) adopting a centralized distributed architecture in the 5G system. When the base station 120 adopts the centralized distributed architecture, it usually includes a central unit (CU) and at least two distributed units (DUs). The CU is provided with a packet data convergence protocol (PDCP) layer, a radio link control (RLC) layer and a protocol stack having a media access control (MAC) layer. The DU is provided with a protocol stack having a physical (PHY) layer. Examples of the disclosure does not limit the specific implementation manner of the base station 120.

A wireless link can be established between the base station 120 and the terminal 110 through a wireless air interface. In different examples, the wireless air interface is a wireless air interface based on the 4G standard. Alternatively, the wireless air interface is a wireless air interface based on the 5G standard, for example, the wireless air interface is a NR. The wireless air interface can also be a wireless air interface based on a standard of next generation mobile communication network technology based on the 5G standard.

In some examples, an end to end (E2E) link may also be established between the terminals 110, for example, a vehicle to vehicle (V2V) communication, a vehicle to infrastructure (V2I) communication and a vehicle to pedestrian (V2P) communication in a vehicle to everything (V2X) communication.

In some examples, the above wireless communication system may also include a network management device 130.

The base stations 120 are coupled to the network management device 130 respectively. The network management device 130 may be a core network device in the wireless communication system. For example, the network management device 130 may be a mobility management entity (MME) of an evolved packet core (EPC). Alternatively, the network management device may also be other core network devices, such as a serving gateway (SGW), a public data network gateway (PGW), a policy and charging rules function (PCRF) unit or a home subscriber server (HSS). The implementation form of the network management device 130 is not limited in examples of the disclosure.

In the LTE narrowband communication, a requirement for coverage enhancement is introduced since an uplink transmission power of the terminal is reduced and a number of downlink reception antennas is reduced. The random access procedure in the coverage enhancement scenario is performed based on each coverage enhancement level, that is, random access resources and a number of random access attempts are configured for each coverage enhancement level. During the random access procedure of the terminal, the terminal can determine an initial coverage enhancement level based on a measured signal strength and then enter a random access attempt based on a parameter of the initial coverage enhancement level. If the UE fails to access at a certain coverage enhancement level, the UE continues to switch to a next coverage enhancement level to try. In the NR, the random access procedure has not yet considered transmission based on the coverage enhancement level, that is, a suitable beam is selected only for a random access attempt based on a signal quality (for example, a reference signal receiving power). After an introduction of the new radio (NR-Lite) of the subsequent communication standard version (R17), a new type of terminal with requirements on a delay, a rate and a cost between the narrowband terminal and the NR terminal is introduced. In the NR-Lite, there are three scenarios, namely industrial sensors, video surveillance and wearable devices. As for the first two scenarios, requirements for coverage enhancement are required. Therefore, it is necessary to consider a working mechanism of random access when the new type of terminal accesses.

Figure 2:
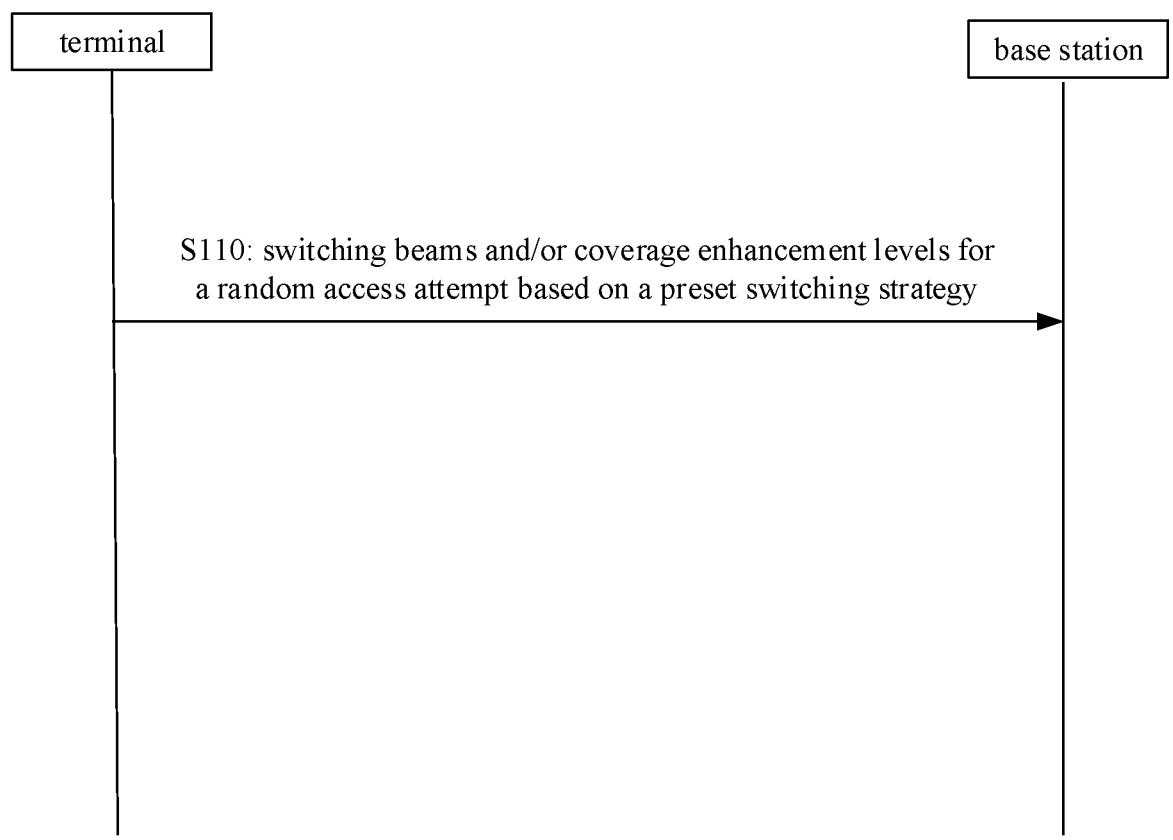
FIG. 2 is a flowchart of a method for random access, according to some examples of the disclosure.

As illustrated in FIG. 2, examples of the disclosure provide a method for random access. The method is applicable to a terminal. The method includes the following.

S110: beams and/or coverage enhancement levels are switched for a random access attempt based on a preset switching strategy. That is, at least one of switching beams and switching coverage enhancement levels, are executed for a random access attempt based on a preset switching strategy.

In examples of the disclosure, terminals may be a variety of communication terminals that can access cellular mobile networks, including but not limited to vehicle-mounted terminals, human-borne terminals, machine type communication (MTC) terminals and/or IoT terminals. The MTC terminal may include a normal MTC terminal and an enhanced MTC terminal.

The terminal may be a New Radio (NR) broadband terminal or a narrowband (NB) terminal or a terminal with a supported bandwidth between a bandwidth of the NR broadband terminal and a bandwidth of the NB terminal.

The higher the coverage enhancement level, the greater the number of repeated transmissions corresponding to the coverage enhancement level; the greater the number of repeated transmissions, the greater a corresponding time diversity. In this way, when the signal strength is relatively low, the coverage enhancement level corresponding to the larger number of repeated transmissions is preferentially selected for the random access attempt.

Figure 3:
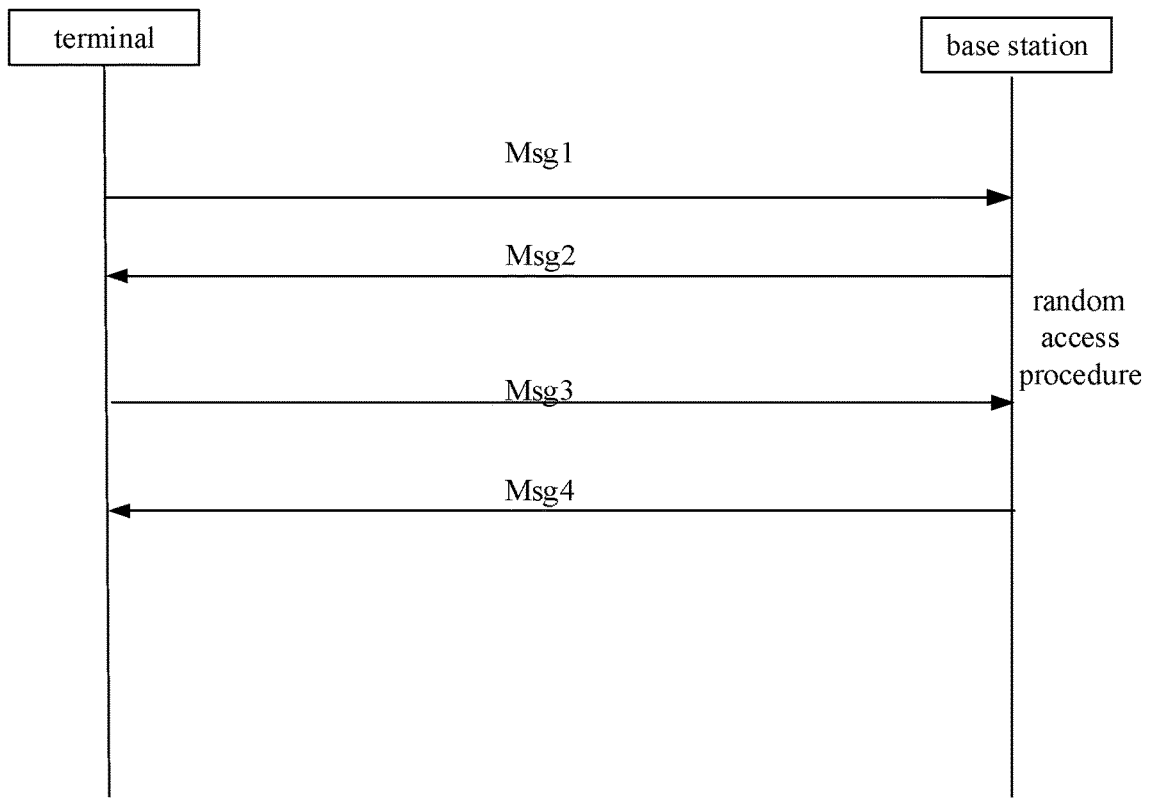
FIG. 3 is a flowchart of a random access procedure, according to the disclosure.

FIG. 3 illustrates an interactive manner of random access attempts between the base station and the terminal.

A first threshold corresponding to an initial coverage enhancement level selected in examples of the disclosure is higher than a signal strength of the detected beam.

A signal strength corresponding to a coverage enhancement level is located between the first threshold and the second threshold. The first threshold is higher than the second threshold.

In some examples of the disclosure, the first threshold corresponding to the selected initial coverage enhancement level is higher than the actual signal strength of the current beam.

The coverage enhancement level where the first threshold of the coverage enhancement level is higher than the signal strength, is the initial coverage enhancement level; and the random access procedure based on the initial coverage enhanced level may include the following.

The terminal transmits a first message (Msg1) to the base station. Generally, the first message may be a message transmitted based on the initial coverage enhancement level. The message carries a random access preamble.

The base station returns a second message (Msg2) to the terminal based on the first message and then can continue. Herein, the second message can be a random access response. The terminal can continue the subsequent random access procedure after receiving the random access response, to switch from an idle state or inactive state to a connected state. If the terminal receives the second response returned based on the first message transmitted with the initial coverage enhancement level, it indicates that the random access attempt is successful, and the terminal may not switch to a next coverage enhancement level or a next beam for the random access attempt.

The terminal can transmit a third message (Msg3) to the base station.

After receiving the third message, the base station can transmit a fourth message (Msg4) to the terminal.

S110 may include: preferentially switching beams for the random access attempt based on the preset switching strategy, and subsequently switching coverage enhancement levels for the random access attempt if random access is still not successful after switching beams; or, preferentially switching coverage enhancement levels for the random access attempt based on the preset switching strategy, and subsequently switching beams for the random access attempt if random access is still not successful after switching coverage enhancement levels.

Switching coverage enhancement levels herein is switching from a low coverage enhancement level to a high coverage enhancement level. A time diversity gain corresponding to the high coverage enhancement level is greater than a time diversity gain corresponding to the low coverage enhancement level.

The preset switching strategy can be transmitted by the base station to the terminal or specified in the protocol, to reduce the random access confusion caused when the random access attempt is performed after the terminal randomly selects switching beams or switching coverage enhancement levels if the initial coverage enhancement level fails, or the intense competition phenomenon caused by all terminals switching the coverage enhancement levels at the same time, or the like.

For example, the base station can transmit indication information of the switching strategy through a high-level signaling or a physical layer signaling. According to the indication information, the terminal can know whether it will perform a next random access attempt or next multiple random access attempts preferentially through switching the coverage enhancement levels or preferentially through switching the beams.

Figure 4:
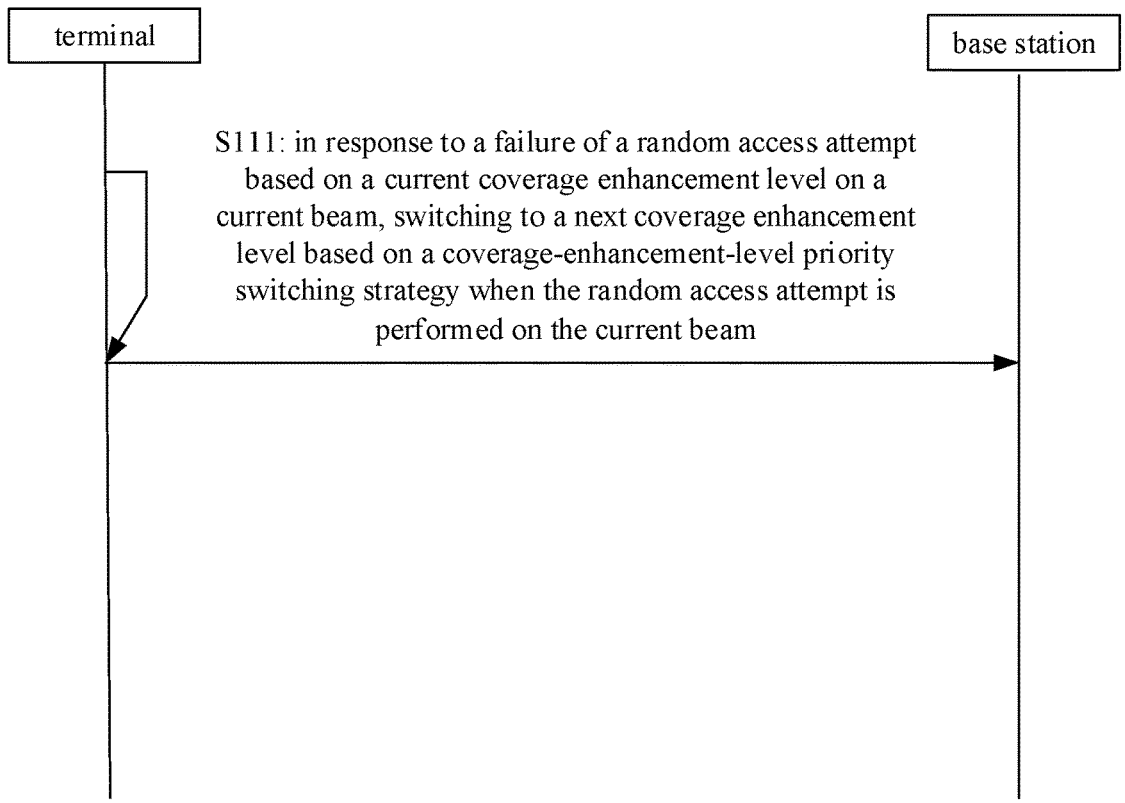
FIG. 4 is a flowchart of a method for random access, according to some examples of the disclosure.

In some examples, as illustrated in FIG. 4, S110 may include the following.

S111: in response to a failure of a random access attempt based on a current coverage enhancement level on a current beam, it switches to a next coverage enhancement level based on a coverage-enhancement-level priority switching strategy when the random access attempt is performed on the current beam. Herein, it switches to the next coverage enhancement level when the random access attempt is performed on the current beam, which means that after switching to the next coverage enhancement level, a next random access attempt is performed on the current beam.

At this time, when the random access attempt fails, the terminal preferentially switches the coverage enhancement levels for the random access attempt. The next coverage enhancement level is higher than the current coverage enhancement level. The current coverage enhancement level for the first random access attempt on the beam is the aforementioned initial coverage enhancement level. For example, when switching the coverage enhancement levels is prioritized, the terminal does not need to switch to another beam, does not re-measure the signal strength of the beam, and does not determine the initial coverage enhancement level to perform the random access attempt again; but it directly switches to the next coverage enhancement level only to perform on the current beam at an opportunity of the next random access, so that the time for successful random access can be advanced.

Figure 5:
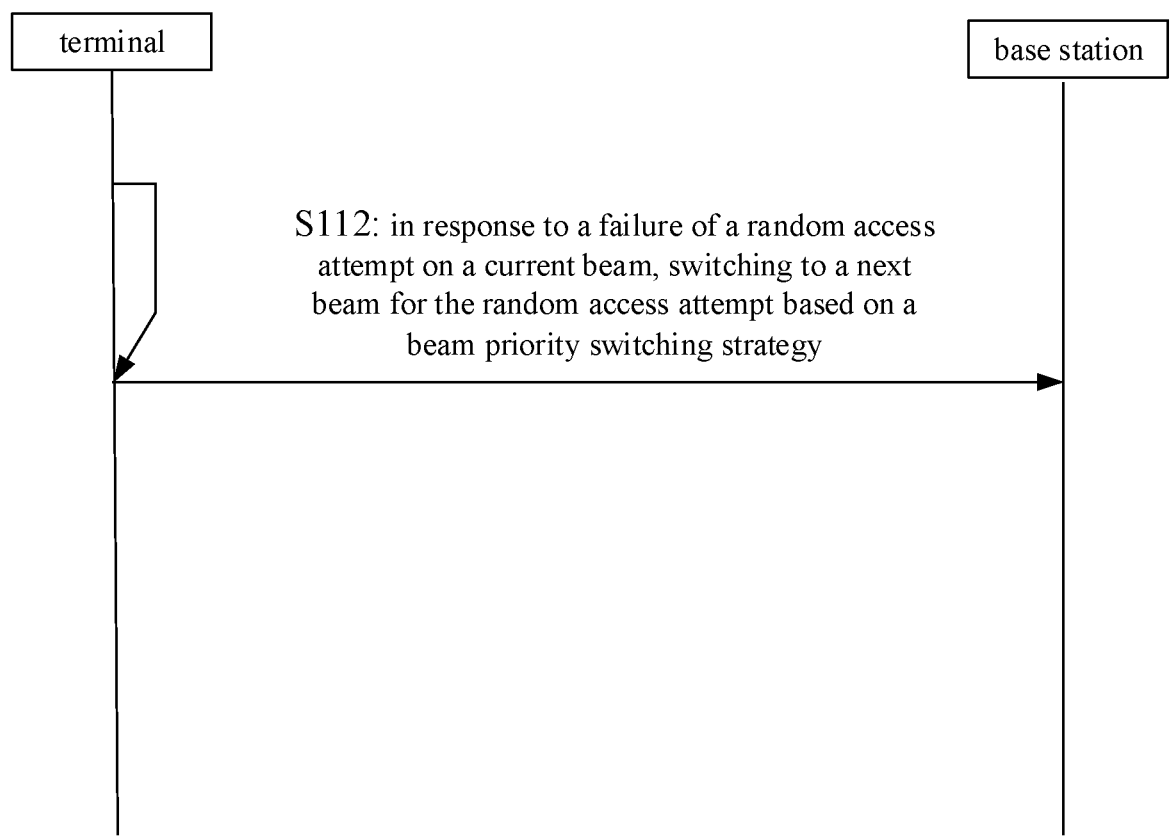
FIG. 5 is a flowchart of a method for random access, according to some examples of the disclosure.

In some examples, as illustrated in FIG. 5, S110 may include the following.

S112: in response to a failure of a random access attempt on a current beam, it switches to a next beam for the random access attempt based on a beam priority switching strategy.

At this time, when the random access attempt fails, the terminal does not directly perform the random access attempt again on the current beam by increasing the coverage enhancement level, but will switch the beams before performing the random access attempt.

In some examples, the coverage-enhancement-level priority switching strategy is applicable to transmission requirements of the first type of service and the beam priority switching strategy is applicable to the second type of service. The allowable delay for the first type of service is less than the allowable delay for the second type of service. For example, the first type of service may be ultra-reliable low latency communication (URLLC) service; and the second type of service may be enhanced mobile broadband (eMBB) service. In this way, a suitable switching strategy is selected according to the type of service that needs to be transmitted after random access, which can meet the timeliness of random access for current service transmission requirements and reduce unnecessary intensity of competition.

The priority switching strategy selected by the terminal may be configured based on the load balance degree on the beam. For example, if the load difference on each beam is within the preset range, the coverage-enhancement-level priority switching strategy is preferentially selected. If the load difference is outside the preset range, the beam priority switching strategy is preferentially selected, so as to achieve beam load balancing on the one hand and reduce unnecessary random access attempts in a corresponding manner on the other hand to improve the success rate of random access attempts.

In some examples, the terminal may also select the coverage-enhancement-level priority switching strategy or the beam priority switching strategy based on its own type.

For example, if the terminal is an industrial sensor or video monitoring device, the coverage-enhancement-level priority switching strategy can be adopted first; and if the terminal is a wearable device or a portable terminal, the beam priority switching strategy can be adopted first. The industrial sensor or video monitoring device may be a fixed terminal or a terminal with a small moving range generally. If beams are switched, it may switch to a beam with the very low beam quality, which may cause further failure of random access attempts, so the coverage-enhancement-level priority switching strategy is preferred. The wearable device is usually worn by a user and is a terminal with a large moving range; and a typical portable terminal includes a mobile phone carried by people or on-board equipment carried by a car. Mobility will enable the terminal to have the better signal quality on multiple beams and it is more appropriate to adopt the beam priority switching strategy.

Switching beams in S112 may be switching sequentially or switching randomly. For example, switching beams herein is switching from strong to weak based on signal strengths of beams.

For example, on the selected M2 beams, traversal switching is performed based on the beam number of the beam from small to large or from large to small.

In some examples, the method further includes: in response to failures of random access attempts based on a coverage enhancement level on all beams, switching to a next coverage enhancement level for the random access attempt.

In some examples, if signal strengths of beams have little difference, at this time, the same coverage enhancement level can be used on different selected beams. In this case, a coverage enhancement level on beams selected for random access based on a selection threshold has the failure of random access, it indicates that the wireless environment has undergone a relatively large change at this time. To accelerate the success of random access, it is directly switched to the next coverage enhancement level for the random access attempt. The next coverage enhancement level is higher than the coverage enhancement level.

For example, random access attempts are made on M2 beams. For example, when coverage enhancement level C fails random access attempts on the M2 beams, regardless of whether the coverage-enhancement-level priority switching strategy or the beam priority switching strategy is adopted, it is first switched to coverage enhancement level C+1 for the random access attempt. The coverage enhancement level C+1 is higher than the coverage enhancement level C.

When random access fails on all beams based on the coverage enhancement level, it is switched to the next coverage enhancement level for the random access attempt, including: selecting beams in order on M2 beams and proceeding based on the coverage enhancement level C+1 for random access attempts.

At this time, to reduce the number of beam switching times for the terminal, the order of switching beams can be: on the selected M2 beams, first performing traversal switching based on the beam number from small to large, and when switching to the beam with the largest beam number, then performing traversal switching based on the beam number from large to small; or, on the selected M2 beams, first performing traversal switching based on the beam number from large to small, and when switching to the beam with the largest beam number, then performing traversal switching based on the beam number from small to large. In this way, when using the coverage enhancement level C to traverse the beams for random access attempts, if the last beam in a round of traversal still fails random access, it can be increased to the next coverage enhancement level and directly perform the random access attempt at the last beam; and if it fails, beam switching is performed in a reverse direction of the previous round of traversal, thereby reducing the number of beam switching times and improving the efficiency of random access.

In other examples, if it is detected that a signal strength difference of beams is relatively large, coverage enhancement levels that can be selected for random access attempts are different. In this case, beams that can be used by the coverage enhancement level are traversed once and the random access attempt still fails, and it will automatically switch to the next coverage enhancement level for the random access attempt. For example, the selected beams whose signal quality is higher than the selection threshold include beam 1 and beam 2. According to the signal strength of beam 1, it is determined that the coverage enhancement levels available on beam 1 include coverage enhancement level 0, coverage enhancement level 1 and coverage enhancement level 2. The coverage enhancement levels available on beam 2 include coverage enhancement level 1 and coverage enhancement level 2. If the random access attempt on beam 1 according to coverage enhancement level 0 fails, the beam traversal that can be used for coverage enhancement level 0 ends, and it automatically switches to coverage enhancement level 1 to traverse beam 1 and beam 2.

Figure 6:
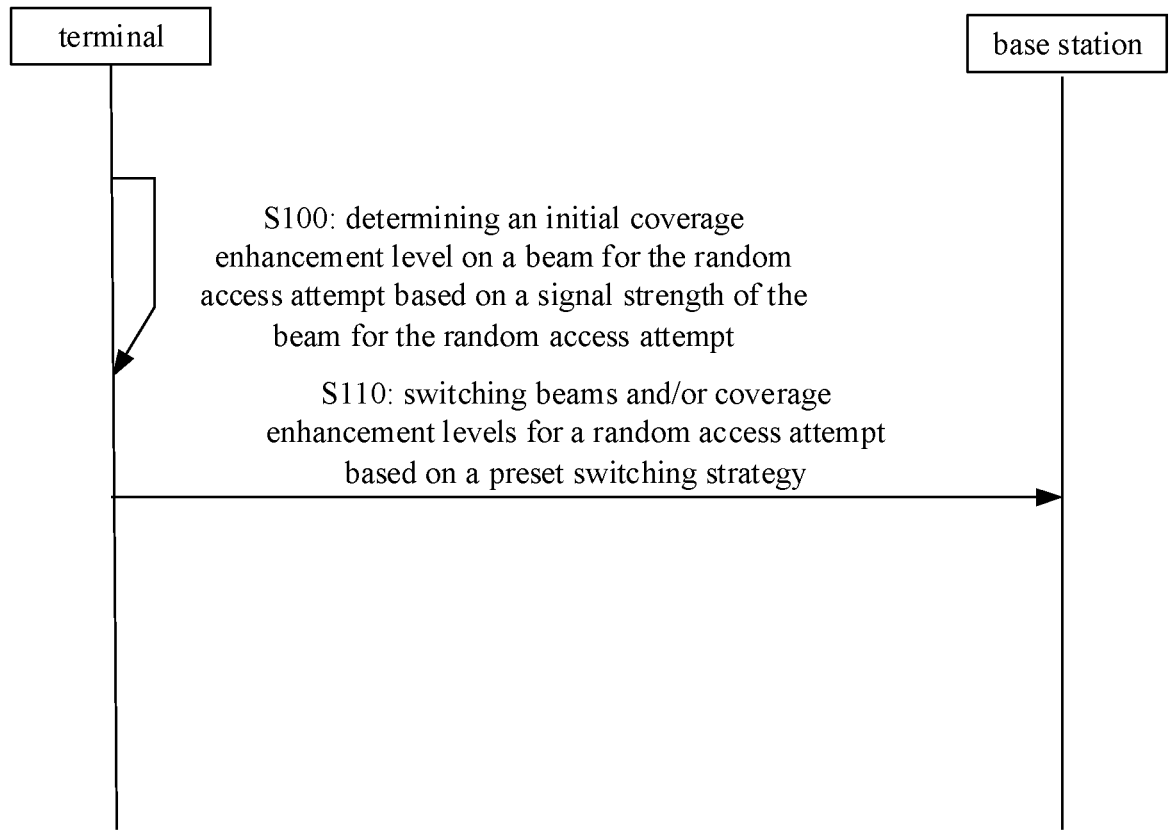
FIG. 6 is a flowchart of a method for random access, according to some examples of the disclosure.

In some examples, as illustrated in FIG. 6, the method for random access further includes the following.

S100: an initial coverage enhancement level on a beam for the random access attempt is determined based on a signal strength of the beam for the random access attempt.

Before the terminal selects a certain beam to perform the random access attempts, it will perform signal measurement on this beam and determine the initial coverage enhancement level in this beam based on the measured signal strength, reducing phenomenon of low random access efficiency caused by selecting the inappropriate initial coverage enhancement level and phenomenon that the competition is too fierce.

In the disclosure, the signal strength on the beam will be measured first. For example, the signal strength of the reference signal on the beam can be measured or the signal strength of the synchronization signal on the beam can be measured. In this way, the reference signal on the beam can not only be used for the original function of the reference signal, but also can be used for the terminal to select the coverage enhancement level on the beam with the first threshold higher than the signal strength as the initial coverage enhancement level. The synchronization signal on the beam can not only be used for downlink synchronization between the base station and the terminal, but also can be used for the terminal to select the coverage enhancement level on the beam with the first threshold higher than the signal strength as the initial coverage enhancement level. In short, in some examples of the disclosure, by measuring the signal strength of the reference signal and/or the synchronization signal on the beam, on the one hand, the signal strength can be used to determine the initial coverage enhancement level, and on the other hand, functional multiplexing of signals carried on the beam is realized.

The initial coverage enhancement level herein is the coverage enhancement level used for the first random access attempt on the beam in a round of random access attempts. The round of random access attempts may include one or more random access attempts.

In some examples of the disclosure, the signal strength may be expressed by reference signal receiving power (RSPR) or signal-to-noise ratio or the like.

In some examples, S100 may include determining the initial coverage enhancement level based on a signal quality of a synchronization signal block (SSB) of the beam for the random access attempt; or determining the initial coverage enhancement level based on a signal quality of a channel-state information reference signal (CSI-RS) of the beam for the random access attempt.

The SSB includes a synchronization signal transmitted by the base station. The synchronization signal may include a primary synchronization signal and/or a secondary synchronization signal.

The CSI-RS is a signal for the terminal to perform channel state measurement and estimation.

Both the SSB and CSI-RS are signals that the terminal can measure on the beam before an attempt process of using the coverage enhancement level with the first threshold of the coverage enhancement level higher than the signal strength as the initial coverage enhancement level.

For example, the terminal scans the beams of the cell in the cell, and determines the signal strength of each beam at its current location by scanning.

In an attempt process of using the coverage enhancement level with the first threshold of the coverage enhancement level higher than the signal strength as the initial coverage enhancement level, the base station chooses a lower coverage enhancement level; the higher the coverage enhancement level, the greater the time diversity gain of Msg1 to reach the base station. Therefore, in the contention-based random access procedure, the terminal cannot compete with other terminals, resulting in a high failure rate of random access attempts of the terminal; or, even in the contention-free random access procedure, since the time diversity gain of the base station is small, and even if a random access request transmitted by a certain terminal is not recognized, the base station will not respond to the random access request, which will also lead to a high failure rate of random access attempts.

Therefore, in short, by determining the initial coverage enhancement level based on the signal strength of the SSB and/or CSI-RS on the beam, on the one hand, it can reduce the phenomenon that there are too many failures for random access attempts caused by the low the initial coverage enhancement level, on the other hand, it can also reduce the phenomenon of poor wireless environment caused by the actual use of the larger coverage enhancement level when it is not necessary to use the larger coverage enhancement level.

In some examples, S110 may include determining the initial coverage enhancement level by comparing the signal strength with thresholds configured by a network side for dividing coverage enhancement levels.

Determining the initial coverage enhancement level by comparing the signal strength with thresholds configured by the network side for dividing coverage enhancement levels may include.

Configured by the network side herein may be: the division threshold of the coverage enhancement level configured by the wireless network, the division threshold of the coverage enhancement level configured by the core network, or the division threshold of the coverage enhancement level configured by the wireless network and the core network together.

For example, there are N division thresholds currently configured and the signal strength is compared with the N division thresholds successively. For example, the signal strength is compared with the N division thresholds according to the thresholds from small to large. When the signal strength is between the first threshold and the second threshold, the coverage enhancement level set at the first threshold and the second threshold is determined to be the initial coverage enhancement level. The first threshold and the second threshold herein are two adjacent division thresholds among the N division thresholds. N is a positive integer not less than 2. If the signal strength is greater than the maximum value among the N division thresholds, the minimum coverage enhancement level is used as the initial coverage enhancement level. Herein, the minimum coverage enhancement level is coverage enhancement level 0. In other words, the signal strength is compared with the division threshold of the coverage enhancement level configured on the network side. If the signal strength is greater than the second threshold of coverage enhancement level A and less than the first threshold of coverage enhancement level A, coverage enhancement level A is selected as the initial coverage enhancement level. In some examples of the disclosure, the division thresholds may include an upper limit and a lower limit of the coverage enhancement level.

For example, there are 4 coverage enhancement levels, corresponding to 3 division thresholds; these 4 coverage enhancement levels are coverage enhancement levels 0 to 3; and determining the initial coverage enhancement level can include: comparing the signal strength with the third division threshold (that is, the minimum division threshold); if the signal strength is less than or equal to the third division threshold, selecting coverage enhancement level 3 as the initial coverage enhancement level; if the signal strength is greater than the third division threshold, comparing the signal strength with the second division threshold (i.e., the second smallest division threshold); if the signal strength is less than or equal to the second division threshold, selecting coverage enhancement level 2 as the initial coverage enhancement level; if the signal strength is greater than the second division threshold, comparing the signal strength with the first division threshold; if the signal strength is greater than the first division threshold, selecting coverage enhancement level 0 as the initial coverage enhancement level; and if the signal strength is less than or equal to the first division threshold, selecting coverage enhancement level 1 as the initial coverage enhancement level.

In some examples, the division thresholds for determining the initial coverage enhancement level based on the signal strength of the SSB may be the same as or different from the thresholds for determining the initial coverage enhancement level based on the signal strength of CSI-RS.

In some examples, the division thresholds for determining the initial coverage enhancement level based on the signal strength of the SSB is different from the division thresholds for determining the initial coverage enhancement level based on the signal strength of the CSI-RS because the two signals are generated in different ways and the signal strengths caused in different ways may also change somewhat, so different division thresholds may be set to determine the more appropriate initial coverage enhancement level.

In some examples, the method further includes determining a random access parameter corresponding to the initial coverage enhancement level based on the signal strength of the beam for the random access attempt; in which the random access parameter corresponding to the initial coverage enhancement level, includes: a number of repeated transmissions, included in a random access attempt corresponding to the initial coverage enhancement level.

For example, the number of repeated transmissions is a positive integer and the value can be 1 or 2. The number of transmissions of Msg1 during one random access attempt is equal to the number of repeated transmissions. For example, if the number of repeated transmissions is N, N random access requests can be transmitted in one random access attempt, which can be specifically: N random access requests are transmitted continuously or the random access preamble can be transmitted continuously for N transmission time lengths, for example, the random access preamble is carried in N subframes and transmitted continuously.

In some examples, the initial coverage enhancement level corresponds to the number of random access attempts on one beam.

In some examples, the initial coverage enhancement level is positively correlated with the number of random access attempts corresponding to the initial coverage enhancement level, that is, the higher the initial coverage enhancement level, the higher the number of random access attempts corresponding to the initial coverage enhancement level, to ensure that the higher coverage enhancement level gets enough coverage enhancement level.

The random access parameter corresponding to the initial coverage enhancement level, including but not limited to the number of random access attempts and/or the number of repeated transmissions in one random access attempt, may be configured in the terminal and the base station or may be pre-transmitted by the base station. For example, the base station transmits the random access parameter of each coverage enhancement level to the terminal through a broadcast message. Once the initial coverage enhancement level is confirmed, the random access parameter for the random access attempt using the initial coverage enhancement level is determined.

In other examples, the number of random access attempts on one beam for the initial coverage enhancement level is a default value.

For example, when the random access parameter of the initial coverage enhancement level does not include the number of random access attempts on one beam, the default value of the number of random access attempts on one beam can be selected to perform the random access attempt on the beam. The default value can be any positive integer, for example, 1 or 2.

In some examples, different beams may be configured with different default values of random access attempts or multiple beams may be configured with a unified default value of random access attempts.

In some other examples, different default values of random access attempts may be configured for the same coverage enhancement level of different beams or a unified default value of random access attempts may be configured for the same coverage enhancement level of multiple beams.

For example, when a random access attempt fails based on the initial coverage enhancement level on a beam, and when it is switched to a coverage enhancement level with a higher transmit power for the random access attempt, since the signal strength measurement on the beam may no longer be performed, the number of random access attempts corresponding to the coverage enhancement level after the switching may be the default value.

In some examples, the method further includes determining a maximum coverage enhancement level on a selected beam based on a threshold of selecting the beam for the random access attempt.

In examples of the disclosure, in the selection of beams for the random access attempt, for example, during the initial selection, the measurement of the signal strength on each beam is combined and the beam with the larger signal strength is selected as the initial beam for random access. The specific selection is to determine whether the corresponding beam is suitable for the corresponding random access attempt according to the selection threshold.

For example, M1 beams are configured in the cell. The terminal scans these M1 beams to obtain the signal strengths of M1 beams for the terminal, and selects M2 beams with the signal strength greater than or equal to the selection threshold for the random access attempt. M1 is a positive integer; and M2 is a positive integer less than or equal to M1. The remaining M1-M2 beams are not used for the random access attempt of the terminal.

In examples of the disclosure, according to the selection threshold, the maximum random access level on the selected M1 beams can be determined.

For example, the selection threshold is −Bdbm, where the second threshold of the division threshold n in the N division thresholds corresponding to the N+1 coverage enhancement levels is less than −Bdbm, coverage enhancement level 0 to coverage enhancement level n are coverage enhancement levels that can be used on the M2 beams, and the maximum coverage enhancement level on these M2 beams is coverage enhancement level n, in which n is a positive integer and B is a positive integer.

In some examples, the method includes switching beams for the random access attempt in response to that a current coverage enhancement level on a beam reaches a maximum coverage enhancement level of the beam.

The maximum coverage enhancement level of the beam may be determined by the aforementioned selection threshold based on the beam or may be configured by the base station through signaling.

In short, in order to reduce unnecessary random access attempts on the beam, if the current coverage enhancement level on the beam has reached the maximum coverage enhancement level of the beam, the random access attempt on the beam will be stopped, and another beam may be switched to for the random access attempt.

In some examples, the method includes switching beams for the random access attempt in response to that a number of random access attempts on a beam reaches a maximum number of random access attempts of the beam.

When the number of random access attempts on a current beam reaches the maximum number of random access attempts, the random access attempts on this beam are stopped, and another beam may be switched to for the random access attempt.

In the LTE narrowband communication, a requirement for coverage enhancement is introduced since an uplink transmission power of the terminal is reduced and a number of downlink reception antennas is reduced. The random access procedure in the coverage enhancement scenario is performed based on each coverage enhancement level, that is, random access resources and a number of random access attempts are configured for each coverage enhancement level. During the random access procedure of the terminal, the terminal will determine the initial coverage enhancement level according to the measured RSRP, and then perform the random access attempt according to the random access parameter of the initial coverage enhancement level. If the terminal fails to access at a certain coverage enhancement level, the terminal continues to switch to the next coverage enhancement level to try; or, switch to the next beam to perform the above process.

In the NR, the random access procedure has not yet considered transmission based on the coverage enhancement level, that is, a suitable beam is selected only for a random access attempt based on a signal quality (for example, a reference signal receiving power). After an introduction of the new radio (NR-Lite) of the subsequent communication standard version (R17), a new type of terminal with requirements on a delay, a rate and a cost between the narrowband terminal and the NR terminal is introduced. In the NR-Lite, there are three scenarios, namely industrial sensors, video surveillance and wearable devices. As for the first two scenarios, requirements for coverage enhancement are required. Therefore, it is necessary to consider a working mechanism of random access when the new type of terminal accesses.

For example, the terminal performs the random access attempt by preferentially increasing the coverage level on the same beam or by preferentially changing the beams.

Before performing the random access attempt on the beam, the terminal determines, based on the measured signal strength on the beam, the initial coverage enhancement level on the beam and the random access parameter corresponding to the initial coverage enhancement level.

As an implementation manner, the random access parameter corresponding to the coverage level includes the number of repeated transmissions of the random access channel in the coverage level during transmission.

As an implementation manner, the random access parameter corresponding to the coverage level includes the number of attempts of the random access channel in the coverage level.

The terminal determining the initial coverage level based on the measured signal strength on the beam may include: comparing the signal strength with the threshold configured by the network to determine the initial coverage enhancement level; as an example, the signal strength on the beam, measured by the UE, may be an SSB-based RSRP; as another example, the signal strength on the beam, measured by the UE, may be a CSI-RS-based RSRP.

For example, the network provides division thresholds for multiple coverage levels, that is, a list that distinguishes each coverage level; in which the list includes one or more division thresholds. As an example, three division thresholds need to be provided to distinguish four coverage enhancement levels.

Based on the coverage-enhancement-level priority switching strategy, it may include the following steps: the terminal selecting a beam; determining an initial coverage level based on the measured RSRP of the beam; transmitting a random access request on a random access channel of the initial coverage level based on the currently selected beam; when the number of repeated transmissions of the random access request reaches the number of repeated transmissions of one random access attempt and the random access is not successful, switching to a next coverage enhancement level; and attempting, still on the currently selected beam, based on the parameter of the next coverage enhancement level.

If the network side provides 3 division thresholds for coverage enhancement levels, 4 coverage enhancement levels are obtained, which are numbered 0, 1, 2 and 3 respectively. The 3 division thresholds are −60 dbm, −70 dbm and −80 dbm respectively; and if the terminal measures the RSRP to be −55 dbm, it will attempt to from coverage enhancement level 0 under the current beam.

The determination of the number of random access attempts for the initial coverage level may include that: if the random access parameter corresponding to the initial coverage level includes the number of random access attempts for the coverage level, random access attempts are made based on this determination; otherwise, random access attempts are made based on the number of random access attempts as 1.

The maximum coverage enhancement level for switching can be determined by the RSRP threshold of the beam selection. The RSRP threshold is used to select some or all beams from multiple beams for random access attempts of the terminal.

For example, if the network side provides 3 division thresholds for coverage enhancement levels, 4 coverage enhancement levels are obtained, which are numbered 0, 1, 2 and 3 respectively. The 3 division thresholds are −60 dbm, −70 dbm and −80 dbm respectively; and if the RSRP threshold for beam selection is −75 dbm, −75 dbm corresponds to coverage enhancement level 2, and the maximum coverage enhancement level is coverage enhancement level 2.

The terminal performs random access attempts by gradually increasing the coverage level on the same beam, and the total number of attempts can be configured to not exceed the maximum number of attempts configured on the beam.

When the terminal performs random access attempts by gradually increasing the coverage level on the same beam, the coverage level that has already been used will not be used again.

For example, on beam 1, it attempts according to coverage enhancement level 0, and then beam 1 is selected again. At this time, if switching to the next coverage enhancement level can be continued, it attempts directly from coverage enhancement level 1.

The terminal performs random access attempts based on the beam priority switching strategy, which may include: step 1: the terminal selecting a beam; step 2: determining an initial coverage level of the beam according to the measured RSRP of the beam; step 3: performing the random access attempt at the initial coverage level according to the currently selected beam; if it fails, returning to step 1 to start execution, and if the random access attempt on the beam is successful, stopping subsequent random access attempts.

For example, if the network side provides 3 division thresholds for coverage enhancement levels, 4 coverage enhancement levels are obtained, which are numbered 0, 1, 2 and 3 respectively. The 3 division thresholds are −60 dbm, −70 dbm and −80 dbm respectively; and if the UE measures the RSRP to be −55 dbm, it will attempt to from coverage enhancement level 0 under the current beam.

The determination of the number of random access attempts for the initial coverage level may include that: if the random access parameter corresponding to the initial coverage level includes the number of random access attempts of the random access channel of the coverage level, random access attempts are made based on this determination; otherwise, random access attempts are made based on the number of random access attempts as 1.

After beams that meet the conditions all have been attempted, it continue to switch to the next coverage enhancement level for attempt again.

The maximum coverage enhancement level for switching can be determined by the RSRP threshold of the beam selection. For example, if 3 division thresholds for coverage enhancement levels are provided, 4 coverage enhancement levels are obtained, which are numbered 0, 1, 2 and 3 respectively. The 3 division thresholds are −60 dbm, −70 dbm and −80 dbm respectively; and if the RSRP threshold for beam selection is −75 dbm, −75 dbm corresponds to coverage enhancement level 2, and the maximum coverage enhancement level is coverage enhancement level 2.

For example, the coverage-enhancement-level priority switching may include that: when the selected beams include beam 1 and beam 2, coverage enhancement level 0 on beam 1 may be used for the attempt; if the random access attempt with coverage enhancement level 0 on beam 1 fails, it is increased to coverage enhancement level 1 on beam 1 for the random access attempt; if the random access attempt with coverage enhancement level 1 fails, it is switched to beam 2 and coverage enhancement level 0 is used for the random access attempt; and if the random access attempt with coverage enhancement level 0 on beam 2 fails, it is increased to coverage enhancement level 1 on beam 2 for the random access attempt.

For example, the beam priority switching may include that: when the selected beams include beam 1 and beam 2, coverage enhancement level 0 on beam 1 may be used for the random access attempt; if it fails, it is switched to beam 2 and coverage enhancement level 0 on beam 2 may be used for the random access attempt; if the random access attempt of coverage enhancement level 0 on beam 2 fails, the random access attempt of coverage enhancement level 1 on beam 1 is attempted; and if it fails, the random access attempt of coverage enhancement level 1 on beam 2 is attempted, until the coverage enhancement level on each selected beam reaches the maximum or the number of random access attempts on each selected beam reaches the maximum or after the random access attempt succeeds.

For another example, if the selected beams include beam 1 and beam 2 and the signal quality difference of beam 1 and beam 2 is relatively large, the initial coverage enhancement levels corresponding to beam 1 and beam 2 are different. At this time, the beam priority switching strategy is performed, which may include that: when the selected beams include beam 1 and beam 2, coverage enhancement level 0 on beam 1 may be used for the random access attempt; if it fails, it is switched to beam 2 and coverage enhancement level 1 on beam 2 may be used for the random access attempt; if the random access attempt of coverage enhancement level 1 on beam 2 fails, the random access attempt of coverage enhancement level 1 on beam 1 is used; and if it fails, the random access attempt of coverage enhancement level 2 on beam 2 is used.

The beam priority switching strategy is performed, which may include that; when the selected beams include beam 1 and beam 2, coverage enhancement level 0 on beam 1 may be used for the random access attempt; if it fails, it is switched to beam 2 and coverage enhancement level 0 on beam 2 may be used for the random access attempt; if the random access attempt of coverage enhancement level 0 on beam 2 fails, the random access attempt of coverage enhancement level 1 on beam 1 is used; and if it fails, the random access attempt of coverage enhancement level 1 on beam 2 is used.

Figure 7:
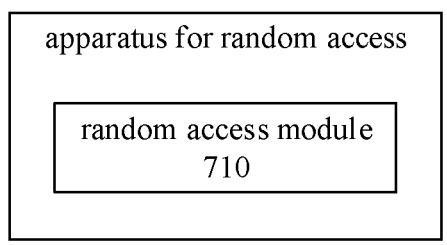
FIG. 7 is a block diagram of an apparatus for random access, according to some examples of the disclosure.

As illustrated in FIG. 7, examples of the disclosure provide an apparatus for random access, which is applied to a terminal and includes a random access module 710.

The random access module 710 is configured to switch beams and/or coverage enhancement levels for a random access attempt based on a preset switching strategy.

In some examples, the random access module 710 may be a program module. After the program module is executed by the processor, it can implement random access attempts through beam switching and/or coverage enhancement level switching.

In other examples, the random access module 710 may be a combination of hardware and software, and the combination of hardware and software may include various programmable arrays. The programmable arrays include, but are not limited to, complex programmable arrays or field programmable arrays.

In some other examples, the random access module 710 may be a pure hardware module, and the pure hardware module may include various application specific integrated circuits.

In some examples, the random access module 710 is configured to, in response to a failure of a random access attempt based on a current coverage enhancement level on a current beam, switch to a next coverage enhancement level based on a coverage-enhancement-level priority switching strategy when the random access attempt is performed on the current beam.

In some examples, the random access module 710 is configured to, in response to a failure of a random access attempt on a current beam, switch to a next beam for the random access attempt based on a beam priority switching strategy.

In some examples, the random access module 710 is configured to, in response to failures of random access attempts based on a coverage enhancement level on all beams, switch to a next coverage enhancement level for the random access attempt.

In some examples, the apparatus further includes: a first determining module, configured to determine an initial coverage enhancement level on a beam for the random access attempt based on a signal strength of the beam for the random access attempt.

In some examples, the first determining module is configured to determine the initial coverage enhancement level based on a signal quality of a synchronization signal block (SSB) of the beam for the random access attempt; or determine the initial coverage enhancement level based on a signal quality of a channel-state information reference signal (CSI-RS) of the beam for the random access attempt.

In some examples, the first determining module is configured to determine the initial coverage enhancement level by comparing the signal strength with thresholds configured by a network side for dividing coverage enhancement levels.

In some examples, the apparatus further includes: a second determining module, configured to determine a random access parameter corresponding to the initial coverage enhancement level based on the signal strength of the beam for the random access attempt; in which the random access parameter corresponding to the initial coverage enhancement level, includes: a number of repeated transmissions, included in a random access attempt corresponding to the initial coverage enhancement level.

In some examples, the random access parameter further includes: a number of random access attempts on one beam, corresponding to the initial coverage enhancement level; or, a number of random access attempts on one beam, corresponding to the initial coverage enhancement level, being a default value.

In some examples, the apparatus further includes: a second determining module, configured to determine a maximum coverage enhancement level on a selected beam based on a threshold of selecting the beam for the random access attempt.

In some examples, the random access module 710 is further configured to switch beams for the random access attempt in response to that a current coverage enhancement level on a beam reaches a maximum coverage enhancement level of the beam.

In some examples, the random access module 710 is further configured to switch beams for the random access attempt in response to that a number of random access attempts on a beam reaches a maximum number of random access attempts of the beam.

Figure 8:
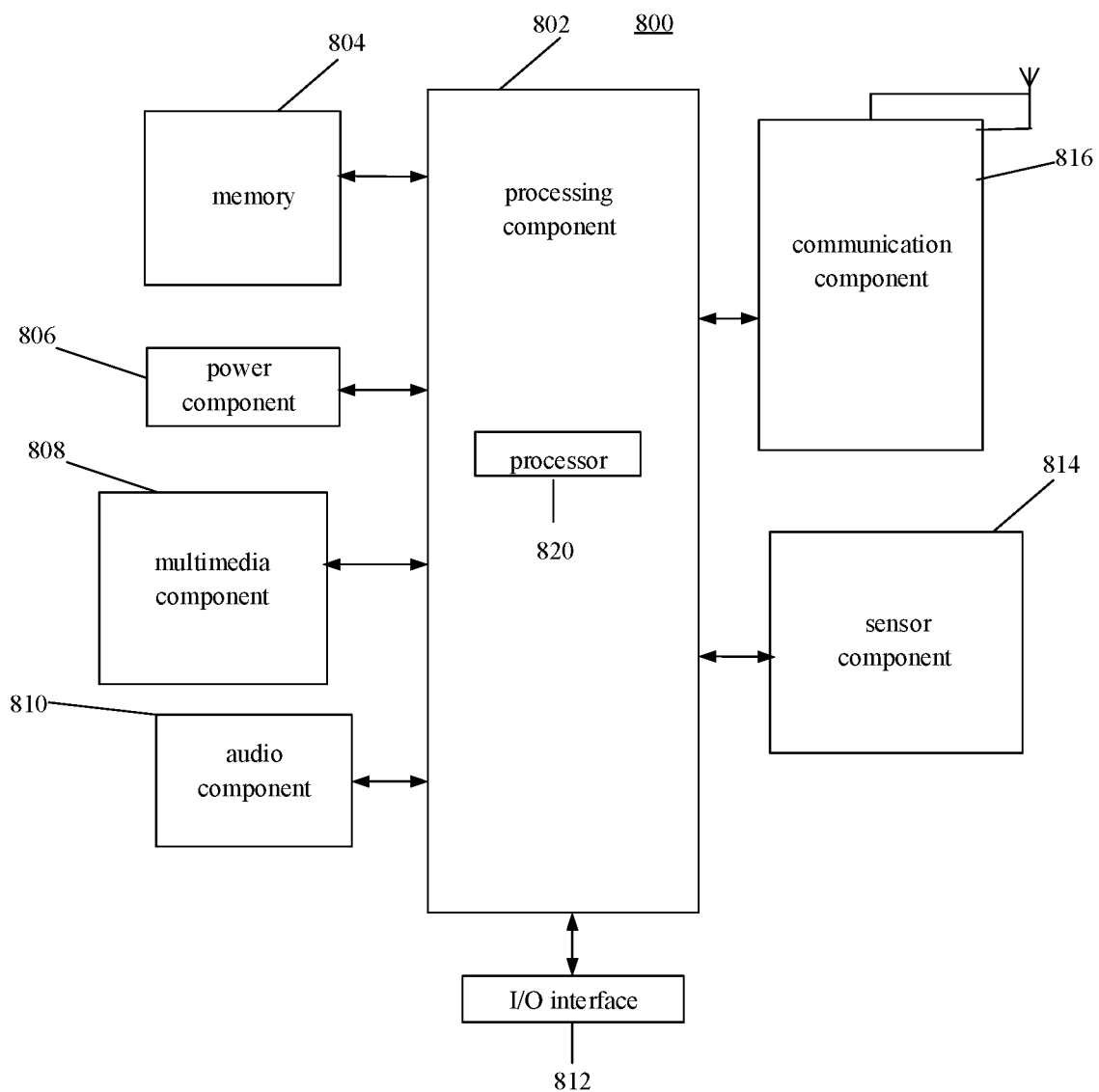
FIG. 8 is a block diagram of a terminal, according to some examples of the disclosure.

FIG. 8 is a block diagram of a terminal, according to some examples of the disclosure. The terminal 800 may be a mobile phone, a computer, a digital broadcast terminal, a messaging device, a gaming console, a tablet, a medical device, exercise equipment, a personal digital assistant, and the like.

Referring to FIG. 8, the terminal 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the terminal 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the terminal 800. Examples of such data include instructions for any applications or methods operated on the terminal 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal 800. The power component 806 may include a power management system, one or more power sources, and any other components associated with the generation, management, and distribution of power in the terminal 800.

The multimedia component 808 includes a screen providing an output interface between the terminal 800 and the user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some examples, the multimedia component 808 includes a front camera and/or a rear camera. The front camera and the rear camera may receive an external multimedia datum while the terminal 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the terminal 800 is in an operation mode, such as a call mode, a recording mode, and a voice recognition mode. The received audio signal may be further stored in the memory 804 or transmitted via the communication component 816. In some examples, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the terminal 800. For instance, the sensor component 814 may detect an open/closed status of the terminal 800, relative positioning of components, e.g., the display and the keypad, of the terminal 800, a change in position of the terminal 800 or a component of the terminal 800, a presence or absence of user contact with the terminal 800, an orientation or an acceleration/deceleration of the terminal 800, and a change in temperature of the terminal 800. The sensor component 814 may include a proximity sensor configured to detect the presence of nearby objects without any physical contact. The sensor component 814 may also include a light sensor, such as a CMOS or CCD image sensor, for use in imaging applications. In some examples, the sensor component 814 may also include an accelerometer sensor, a gyroscope sensor, a magnetic sensor, a pressure sensor, or a temperature sensor.

The communication component 816 is configured to facilitate communication, wired or wirelessly, between the terminal 800 and other devices. The terminal 800 can access a wireless network based on a communication standard, such as WiFi, 2G, or 3G, or a combination thereof. In one example, the communication component 816 receives a broadcast signal or broadcast associated information from an external broadcast management system via a broadcast channel. In one example, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some examples, the terminal 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some examples, there is also provided a non-transitory computer-readable storage medium including instructions, such as included in the memory 804, executable by the processor 820 in the terminal 800, for performing the above-described methods. For example, the non-transitory computer-readable storage medium may be a ROM, a RAM, a CD-ROM, a magnetic tape, a floppy disc, an optical data storage device, and the like.

Figure 9:
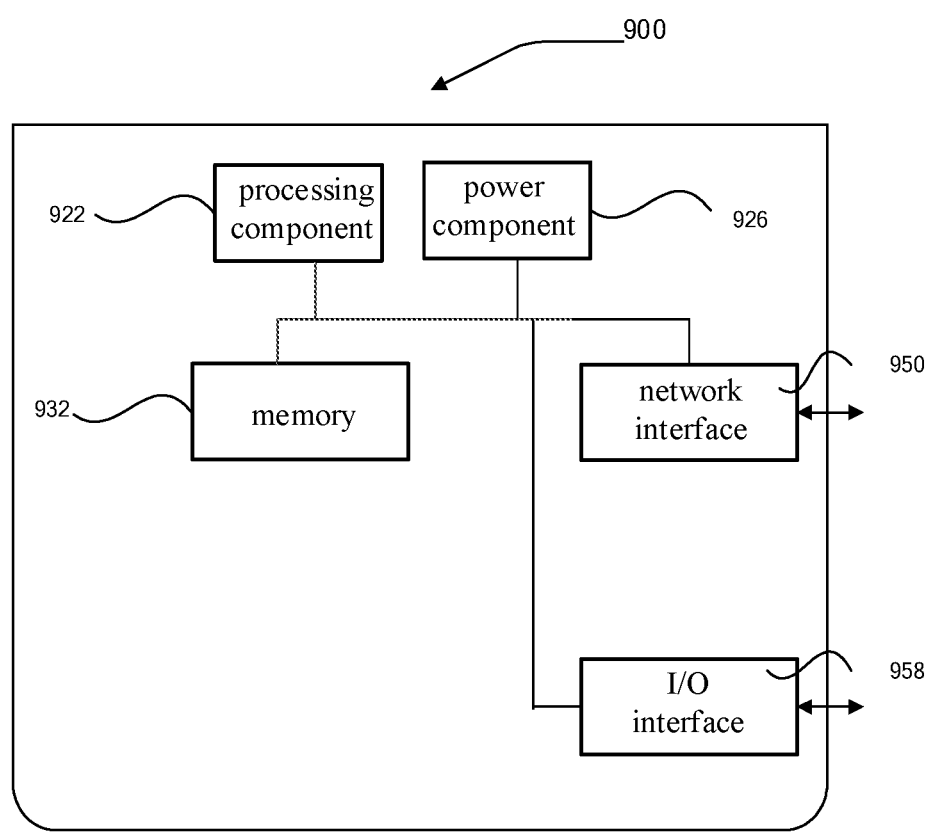
FIG. 9 is a block diagram of a base station, according to some examples of the disclosure.

FIG. 9 is a block diagram of a base station, according to some examples of the disclosure. Referring to FIG. 9, the base station 900 may include includes a processing component 922, which further includes one or more processors, and a memory resource represented by a memory 932 for storing instructions that may be executed by the processing component 922, such as application programs. The application program stored in the memory 932 may include one or more modules each corresponding to a set of instructions. In addition, the processing component 922 is configured to execute instructions to perform the above method.

The base station 900 may also include a power component 926 configured to perform power management of the base station, a wired or wireless network interface 950 configured to connect the base station 900 to the network, and an input output (I/O) interface 958. The base station 900 may operate based on an operating system stored in the memory 932, such as Windows Server™, Mac OS X™, Unix™, Linux™, FreeBSD™ or the like.

A terminal is provided according to examples of the disclosure. The terminal includes: an antenna; a memory; and a processor, respectively connected to the antenna and the memory, configured to, by executing computer-executable instructions stored on the memory, control wireless signal transmission and reception of the antenna and perform the method for random access as described in any above example, such as one or more in the methods of FIG. 2, FIG. 4 and FIG. 5.

A computer storage medium is provided according to examples of the disclosure. The computer storage medium has stored therein computer-executable instructions that, when executed by a processor, the method for random access as described in any above example is performed, such as one or more in the methods of FIG. 2, FIG. 4 and FIG. 5.

With the examples of the disclosure, when performing the random access attempt, the beams and/or the coverage enhancement levels are switched for the random access attempt based on the preset switching strategy; instead of performing the random access attempt after randomly switching the beams or the coverage enhancement levels, so as to reduce random access confusion caused by not selecting a suitable switching strategy for the current random access service, wireless environment and/or terminal type, or an intense competition phenomenon caused by all terminals switching the coverage enhancement levels at the same time. It is possible to select a suitable switching manner for the current random access scenario based on the preset strategy to reduce the random access confusion or increase the success rate of random access.

Other examples of the disclosure will be apparent to those skilled in the art from consideration of the specification and practice of the disclosure disclosed here. The disclosure is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for random access, comprising:
   determining a coverage enhancement level on a beam for the random access attempt and a random access parameter corresponding to the coverage enhancement level based on a signal strength of a measured beam;
   switching the coverage enhancement level based on a preset switching strategy; and
   performing a random access attempt based on the random access parameter corresponding to the coverage enhancement level.

2. The method as claimed in claim 1, further comprising:
   in response to a failure of a random access attempt based on a given coverage enhancement level on a beam, switching to a next coverage enhancement level for the random access attempt.

3. The method as claimed in claim 1, wherein determining the coverage enhancement level on the beam for the random access attempt based on the signal strength of the measured beam comprises:
   determining the coverage enhancement level based on a signal quality of a synchronization signal block (SSB) of the measured beam; or
   determining the coverage enhancement level based on a signal quality of a channel-state information reference signal (CSI-RS) of the measured beam.

4. The method as claimed in claim 1, wherein determining the coverage enhancement level on the beam for the random access attempt based on the signal strength of the measured beam comprises:
   determining the coverage enhancement level by comparing the signal strength with thresholds configured by a network device for dividing coverage enhancement levels.

5. The method as claimed in claim 1, wherein the random access parameter corresponding to the coverage enhancement level comprises at least one of:
   a repetition number of transmissions comprised in one random access attempt corresponding to the coverage enhancement level;
   a number of random access attempts on one beam, corresponding to the coverage enhancement level; or
   a default value of a number of random access attempts on one beam, corresponding to the coverage enhancement level.

6. The method as claimed in claim 1, further comprising:
   determining a maximum coverage enhancement level on a selected beam based on a threshold of selecting the beam for the random access attempt.

7. The method as claimed in claim 1, further comprising at least one of:
   switching beams for the random access attempt in response to determining that a current coverage enhancement level on a beam reaches a maximum coverage enhancement level of the beam;
   switching beams for the random access attempt in response to determining that a number of random access attempts on a beam reaches a maximum number of random access attempts of the beam;
   in response to a failure of a random access attempt on a current beam, switching to a next beam for the random access attempt based on a beam priority switching strategy; or in response to failures of random access attempts based on a coverage enhancement level on all beams, switching to a next coverage enhancement level for the random access attempt.

8. A terminal, comprising:
a memory; and
a processor, respectively connected to the memory, configured to, by executing computer-executable instructions stored on the memory, perform:
determining a coverage enhancement level on a beam for the random access attempt and a random access parameter corresponding to the coverage enhancement level based on a signal strength of a measured beam;
switching the coverage enhancement level based on a preset switching strategy; and
performing a random access attempt based on the random access parameter corresponding to the coverage enhancement level.

9. A non-transitory computer-readable storage medium having stored therein computer-executable instructions that, when executed by a processor, a method for random access is performed, the method comprising:
determining a coverage enhancement level on a beam for the random access attempt and a random access parameter corresponding to the coverage enhancement level based on a signal strength of a measured beam;
switching the coverage enhancement level based on a preset switching strategy; and
performing a random access attempt based on the random access parameter corresponding to the coverage enhancement level.

10. The terminal as claimed in claim 8, wherein the processor is further configured to perform:
in response to a failure of a random access attempt based on a given coverage enhancement level on a beam, switching to a next coverage enhancement level for the random access attempt.

11. The terminal as claimed in claim 8, wherein determining the coverage enhancement level on the beam for the random access attempt based on the signal strength of the measured beam comprises:
determining the coverage enhancement level by comparing the signal strength with thresholds configured by a network device for dividing coverage enhancement levels.

12. The method as claimed in claim 1, wherein the signal strength comprises a Reference Signal Receiving Power (RSRP).

13. The method as claimed in claim 12, wherein a threshold of the RSRP is configured to select some or all beams from a plurality of beams for random access attempts of the terminal.

14. The method as claimed in claim 5, wherein the repetition number of transmissions comprised in one random access attempt corresponding to the coverage enhancement level is N, where N is a positive integer, and the repetition number N of transmissions represents one of:
N random access requests transmitted in one random access attempt;
N random access requests transmitted continuously in one random access attempt;
N transmission time lengths for which a random access preamble is transmitted continuously in one random access attempt; or
N subframes where the random access preamble is carried and transmitted continuously in one random access attempt.

15. The method as claimed in claim 5, further comprising:
performing the random access attempt based on a number of random access attempts corresponding to a coverage level comprised in the random access parameter corresponding to the coverage enhancement level.

16. The terminal as claimed in claim 8, wherein the signal strength comprises a Reference Signal Receiving Power (RSRP).

17. The terminal as claimed in claim 16, wherein a threshold of the RSRP is configured to select a part of or all of beams for the random access attempt of the terminal from a plurality of beams.

18. The terminal as claimed in claim 8, wherein the random access parameter corresponding to the coverage enhancement level comprises at least one of:
a repetition number of transmissions comprised in one random access attempt corresponding to the coverage enhancement level;
a number of random access attempts on one beam, corresponding to the coverage enhancement level; or
a default value of a number of random access attempts on one beam, corresponding to the coverage enhancement level.

19. The terminal as claimed in claim 18, wherein the repetition number of transmissions comprised in one random access attempt corresponding to the coverage enhancement level is N, where N is a positive integer, and the repetition number N of transmissions represents any of:
N random access requests transmitted in one random access attempt;
N random access requests transmitted continuously in one random access attempt;
N transmission time lengths for which a random access preamble is transmitted continuously in one random access attempt; or
N subframes where the random access preamble is carried and transmitted continuously in one random access attempt.

20. The terminal as claimed in claim 18, wherein the processor is further configured to:
perform the random access attempt based on a number of random access attempts corresponding to a coverage level comprised in the random access parameter corresponding to the coverage enhancement level.

* * * * *